United States Patent [19]
DeLalio

[11] 3,855,879
[45] Dec. 24, 1974

[54] SYNCHRONOUSLY SHIFTABLE DUAL RANGE PLANETARY TRANSMISSION WITH COAXIAL INPUT SHAFTS

[76] Inventor: George M. DeLalio, 81 Gazza Blvd., Farmingdale, N.Y. 11735

[22] Filed: Dec. 22, 1972

[21] Appl. No.: 317,528

[52] U.S. Cl. .................. 74/687, 74/720.5, 74/730
[51] Int. Cl. ...................... F16h 47/04, F16h 37/06
[58] Field of Search .................... 74/687, 720.5, 730

[56] References Cited
UNITED STATES PATENTS

| | | | |
|---|---|---|---|
| 2,907,230 | 10/1959 | Kollmann | 74/687 |
| 2,960,825 | 11/1960 | Sampietro et al. | 74/687 |
| 3,283,612 | 11/1966 | Densham | 74/687 |
| 3,396,607 | 8/1968 | Ross | 74/687 |
| R27,307 | 3/1972 | DeLalio | 74/687 |

Primary Examiner—Samuel Scott
Assistant Examiner—P. S. Lall
Attorney, Agent, or Firm—Snyder, Brown and Ramik

[57] ABSTRACT

A vehicle transmission employs a pair of coaxial input shafts, one driven at fixed ratio and the other driven at an infinitely variable ratio through a hydrostatic transmission which relatively reverses direction of rotation. A single input-dual input planetary gear assembly couples the coaxial input shafts to an output shaft. The planetary gear assembly is made up of a reverse and low forward speed planetary gear set and a high forward speed planetary gear set connected together to provide a four element planetary gear assembly synchronously shiftable between low and high ranges and which provides torque multiplication throughout the speed range and produces the same direction of rotation of all four elements at substantially or at the same speed when operating at the maximum forward speed condition.

14 Claims, 16 Drawing Figures

SYNCHRONOUSLY SHIFTABLE DUAL RANGE PLANETARY TRANSMISSION WITH COAXIAL INPUT SHAFTS

BACKGROUND OF THE INVENTION

This invention relates to power transmission devices and is directed in particular to such devices in which there is a continuously variable input-output speed ratio capability. Furthermore, this invention is directed to the above type of device in which the power transmitting characteristics are particularly favorable in connection with automotive use, although it is to be understood that the invention is not limited to such use.

It has long been recognized that vehicle transmissions employing planetary gear sets offer many advantages over other types. The multiple tooth contact and symmetrical distribution of loading provide efficient use of material, compactness and ruggedness of planetary gear sets. They also lend themselves to constructions in which the gear ratio changes may be effected by hydraulic actuators and when coupled to the input shaft through hydraulic torque converters offer a degree of smoothness and operation which has led to their virtual universal use as a standard power transmission for automotive and similar vehicles.

The inherent advantages of this already developed transmission technology has been integrated with an infinitely variable hydraulic drive to provide an improved continuously variable transmission. The infinitely variable drive may include any type of positive controllable drive such as a hydrostatic pump-motor circuit. A typical approach utilizes a dual mode operation employing a single input drive to the planetary for one mode or range of operation and a dual input drive to the planetary for another mode or range of operation and having synchronous shifting capability between the two modes. Examples of this operation are presented in my prior Pat. No. 3,306,129, Feb. 28, 1967, and its Reissue Pat. No. Re. 27,307, Mar. 14, 1972, and Ross Pat. 3,396,607, Aug. 13, 1968.

Figure 8:
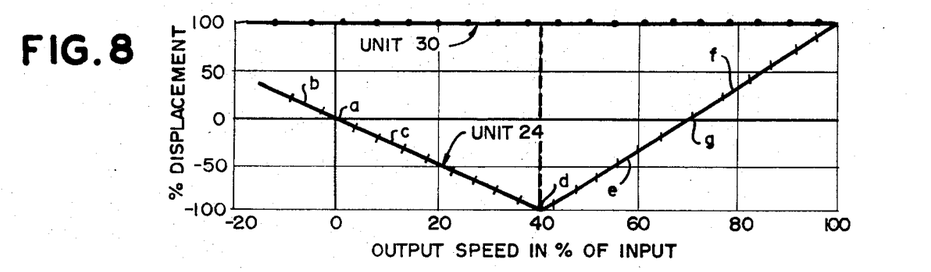

In my prior patent and its reissue No. Re. 27,307, there is shown in FIG. 8 thereof a transmission which operates, in one range, as a split power path transmission having one power path directed through an infinitely variable hydrostatic drive to one element of a high speed planetary gear set and a second power path of the mechanically coupled type directed to another element of the high speed planetary gear set. When operated thus, this transmission is in its high speed mode of operation and when in this mode its range is extended by virtue of functioning the hydrostatic drive to impart input rotation first in one direction of rotation and later in the opposite direction of rotation. For reverse and low speed operation, the ring gear of a low speed planetary gear set is braked and single drive input through the hydrostatic drive unit is applied to the sun gear of the low speed planetary set. In this way, the torque multiplying characteristic available from the low speed planetary gear set is utilized in the low speed mode.

In the Ross Pat. No. 3,396,607, another approach is used. In this case, a planetary gear is used to receive dual input drive thereto in high speed mode, one input being through a hydrostatic unit to the ring gear and the other input is a mechanical drive to the planet carrier. In low range, this same planetary gear set is locked out (the ring gear is coupled directly to the planet carrier) so that it functions as a direct coupling and not as a planetary gear set is not realized.

In designing any planetary gear system for a transmission, it is well understood that there are practical limits on the relative sizes of the sun and planet gears. For example, the maximum size ratio between the sun gear and planet gears is limited to about 2.5/1 otherwise the relative planet gear diameter becomes so small that there is no practical way to support the planet gears on individual shafts and bearings. At the other end of the scale, if the sun gear is of small size with relation to the planet gears difficulties are also encountered. For example, if the size ratio between the sun gear and planet gears is 1/2.5, the sun gear becomes so small that its load carrying capacity and support become completely impractical. The choice of which of these gears is to be larger of course depends upon the selection of which element of the planetary is to receive the drive input, which is to deliver the drive output and which is to be braked. Accordingly the gear sizes, the basic planetary kinematics, practical limits of the number of gear teeth and power path through the planetary impose stringent design limits on the system.

If, now, one imposes upon this design the further requirement that it shall be capable of dual mode operation, provision must be made for the fact that in one mode there will be a single input whereas in the other mode there will be dual input to the planetary system. Within this further constraint, the practical difficulties are multiplied if one is to achieve the requisite torque multiplication in low and reverse speed mode and also the requisite extended range in high speed mode.

Still further complications arise if the dual mode transmission is also desired to allow for synchronous shifting between modes.

Synchronous mode or range operation imposes additional design limitations on the planetary gear system. In addition to providing the operating drive ratios the planetary must further be constructed to provide that when operating in one mode that the connecting drive for the other mode of operation be rotating in the same direction and at the same speed as the member to which it is to be connected.

To achieve the desired dual mode, extended high speed range and synchronous shifting functions in my prior Pat. No. 3,306,129 and its Reissue No. Re. 27,307, as shown in FIG. 8, the single input mode is through the main shaft to the sun gears and the dual input mode employs a second shaft which is in spaced, parallel relation to the main shaft and connects to the forward carrier member.

In the Ross Pat. No. 3,396,607 the dual drive connection is also through parallel shafts. However, since this planetary is non-functional in the single input or low range mode (i.e. it is locked and no torque multiplication is effected) the necessary torque multiplication must and is provided by gear reduction from the power planet to the single input drive to the locked planetary.

These and similar prior art transmissions have a common construction where the single and dual drive connections are necessarily spaced on parallel drive shafts in order to effect the necessary driving speeds, direction of rotation and connection points on the planetary gear system. From a practical point of view, such arrangement means that the extreme compactness necessary for automotive use cannot be attained. This is a serious disadvantage not only for the reason that space limitations are of vital importance in automobiles but also for the reason that parallel input shafts require extra gears and greater complication with consequent high cost of manufacture. Whereas the cost consideration is of substantial significance in heavy duty transmissions, it is a primary if not overriding consideration in automotive transmissions.

In addition, any practical transmission must be capable of achieving a reasonable final output speed usually the same as the input speed or essentially a 1:1 ratio and it being understood that variations in vehicle weight, power, usage etc. are normally provided for by selection of rear axle gear ratios. In automotive usage, the final output ratio represents the most used condition of operation and it is preferred that the construction be the most efficient and long lasting at or near the 1:1 ratio.

In systems such as exemplified by the Ross patent where a single planetary gear set is used as a locked coupling in one range and with dual-input drive in the other range certain disadvantages ensue in connection with the overall operation. Most apparent is that in low range the planetary is direct coupled and does not function to multiply torque at maximum torque output operation. This requires the input gear reduction in single input drive as above mentioned. In high range the planetary functions to overdrive the output with respect to the dual drive input and with the addition of the single drive input results in a substantial overdrive of the planetary output which is undesirable due to dynamic loadings on the planetary gear set and also requires an additional gear reduction beyond the transmissions in order to achieve an approximate 1:1 ratio.

In my prior patent and its Reissue, a low speed planetary gear set is used as such in reverse and the low speed mode and a high speed planetary gear set is used with dual-input drive in the high speed mode. Consequently, the general arrangement provides torque multiplication characteristics of a low range planetary gear set with single input drive coupled with a differential dual-input synchronous shiftable high speed planetary gear set offering substantial advantage from the practical design point.

If, in addition, such an arrangement could be so constructed as to be economical of manufacture while also obtaining a high degree of mechanical efficiency, a powerful tool for achieving a practical vehicle transmission meeting present and projected emission standards would be obtained. That is to say, the continuously variable drive ratio characteristic coupled with high mechanical efficiency would allow the most efficient use of power plants which are capable of meeting stringent emission standards.

BRIEF SUMMARY OF THE INVENTION

Essentially, the present invention is directed to the discovery that a continuously variable ratio, synchronously shiftable power transmission employing low and high speed planetary gear sets in which favorable ratios are practically attainable while achieving a highly efficient, compact and long-lasting system if the dual input shafts are coaxially arranged.

In general, the power transmissions of this invention are characterized by the use of centered, axially spaced low and high speed planetary gear sets having common sun gear input from an input quill shaft driven from the power plant through a variable hydrostatic drive system. The reaction member or ring gear of the low speed planetary gear set is selectively braked and the planet gear carrier of this gear set is mechanically coupled directly to either the planet gear carrier or the ring gear of the high speed planetary gear set. The transmission output is from that element (either the planet gear carrier or ring gear) of the high speed planetary gear set which is coupled to the planet gear carrier of the low speed planetary gear set and selective drive to the high speed element, so coupled to the low speed planet gear carrier, is effected through an inner input shaft coaxial with the input quill shaft. The gear ratios and arrangements of the two planetary gear sets are such that in low speed mode the hydrostatic drive system may be varied as to input-output ratio from a reverse speed transmission output direction through vehicle standstill to a maximum input quill shaft speed at which synchronous shifting is effected to high speed mode by disengaging the low speed planetary brake while engaging the high speed planetary clutch, whereafter the hydrostatic drive system is retroacted from its maximum input quill shaft speed condition to increase the transmission output ratio in high range.

For automotive use, the final output ratio of the transmission may be 1:1 with the sun gear input, quill shaft and all the planetary gear system elements rotating substantially in unison.

For other use as for example in off-the-road equipment where the operation is usually at lower output speeds the final output ratio of the transmission may also be as above but with the arrangement being such that the sun gear input and other load carrying elements approach unison operation at a lower transmission output speed.

To avoid confusion, the term "output ratio" as used herein shall be understood to mean the ratio in rotational speed as between the output and the input. For example, an "overdrive" output ratio condition might be 1.2/1 and would be higher than a "direct" drive output ratio of one-to-one. This arbitrary convention is used to secure correspondence with vehicle speed, i.e. the higher the output ratio, the higher the vehicle speed assuming constant speed input, and to avoid confusion in the terms "low speed" and "high speed" which are used in association with the low speed and high speed planetary gear sets. It should be noted, however, that in this convention torque multiplication increases as the output ratio decreases and vice versa.

DETAILED DESCRIPTION OF THE INVENTION

Figure 1:
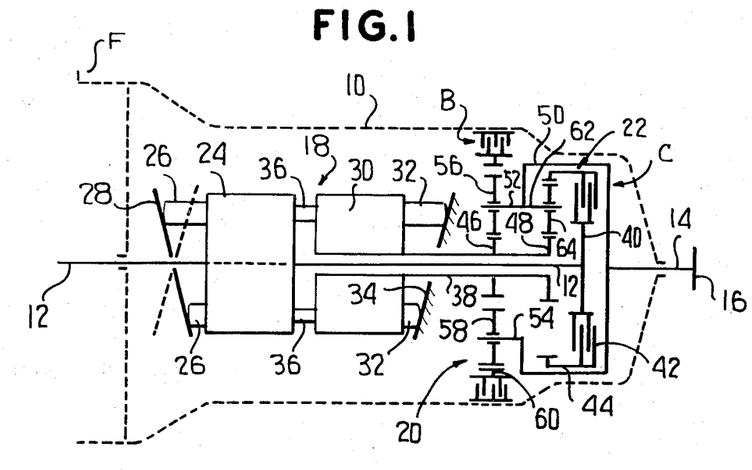
FIG. 1 is a longitudinal section diagrammatically illustrating the components of one embodiment of the present invention.

In FIG. 1, the dashed line 10 indicates the outline of the transmission case or housing which will be recognized as of substantially conventional configuration, having a mounting flange portion F at one end by means of which the transmission assembly may be attached to the associated power plant, as for example the flywheel housing of an internal combustion engine. At the forward end of the transmission casing there is provided a power input shaft 12 adapted to be connected to the associated power input means (not shown) and this shaft extends axially into the housing from the forward end thereof, as shown. At the opposite or rear end of the transmission casing and projecting axially outwardly therefrom in alignment with the input shaft 12 is the output shaft 14 having as is usual a coupling flange 16 thereon.

Within the casing there is provided a hydrostatic drive unit indicated generally by the reference character 18 and a pair of in-line planetary gear sets indicated generally by reference characters 20 and 22. The hydrostatic drive unit may be constructed as described in my aforementioned reissue patent and includes a driving member 24 fixed to and rotating in unison with the input shaft 12. As will be understood, the unit 24 includes a number of pistons or plungers 26 and an angularly adjustable swash plate 28 is associated therewith as shown capable of adjustment between two extreme positions on either side of center or neutral position, as is illustrated. The hydrostatic drive assembly includes a driven unit 30 likewise having plungers or pistons 32 associated therewith which react against a fixed, inclined reaction surface 34, as shown. The two units 24 and 30 are interconnected by ports such as are indicated by reference characters 36 and it will be appreciated that with the swash plate 28 in the full-line position as shown, rotation of the driving member 24 will impart the opposite rotational drive to the driven member 34 whereas when the swash plate 28 in the dashed-line position as shown in FIG. 1, the driving and driven elements 24 and 30 will rotate in the same direction.

The driven unit 30 is fixed to a hollow or quill shaft 38 which, together with the previously mentioned input shaft 12 constitutes the two inputs to the planetary units 20, 22. It is a particular feature of this invention that the two input shafts 12 and 38 are coaxial, the input shaft 12 being disposed within the quill shaft 38 and projecting completely therethrough for connection at one extremity to the power input means and at its opposite extremity to an element of the high speed planetary gear set 22. In the embodiment as illustrated, the input shaft 12 is connected to the driving element 40 of a clutch C the driven elements 42 of which are fixed to ring gear 44 of the planetary gear set 22. The quill shaft 38 carries a pair of sun gears 46 and 48 of the two planetary gear sets 20 and 22 so that the quill shaft which represents the hydraulic power input to the unit effects sun gear input means to the two planetary gear sets 20 and 22.

The planet gear carrier 50 extends around the planetary gear set 22 therewithin and is fixed to the output shaft 14 as shown so that the output of the transmission continuously is from this carrier 50 as illustrated. Rotatably mounted on the carrier are stub shafts such as those indicated by reference characters 52 and 54 which rotatably support the respective meshing planet gears 56 and 58, the former of which are in further mesh with the sun gear 46 and the latter of which are in further mesh with the ring gear 60 which thus, together with the sun gear 46 constitute the planetary gear set 20, hereinafter referred to as the low speed planetary gear means or gear set. A selectively operable brake B is effective as hereinafter more particularly described, to fix or lock the ring gear 60 of the low speed planetary gear means and is operated in conjunction with the clutch C as is also hereinafter described.

The planet carrier 50 also includes stub shafts 62 on which the planet gears 64 are journalled and which mesh between the sun gear 48 and the ring gear 44 of the second planetary gear set 22, hereinafter referred to as the high speed planetary gear means or gear set.

Figure 2:
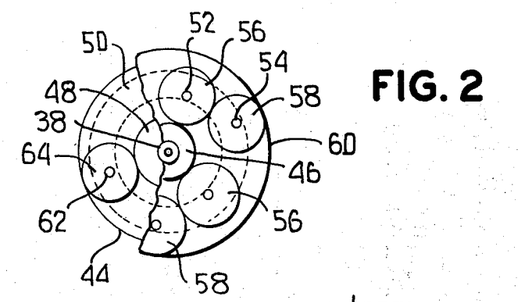
FIG. 2 is a transverse view, partly broken away, illustrating the arrangements of the two planetary gear sets of FIG. 1.
Figure 6:
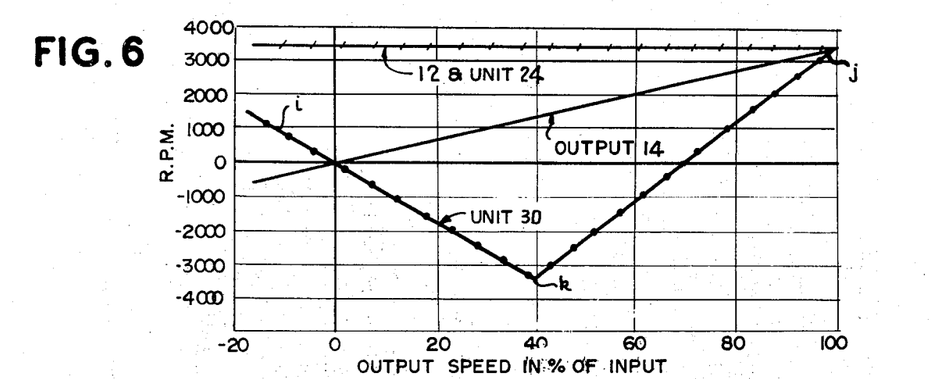
FIGS. 6, 7 and 8 are graphs illustrating certain characteristics of the transmission according to the embodiment of FIG. 1.
Figure 7:
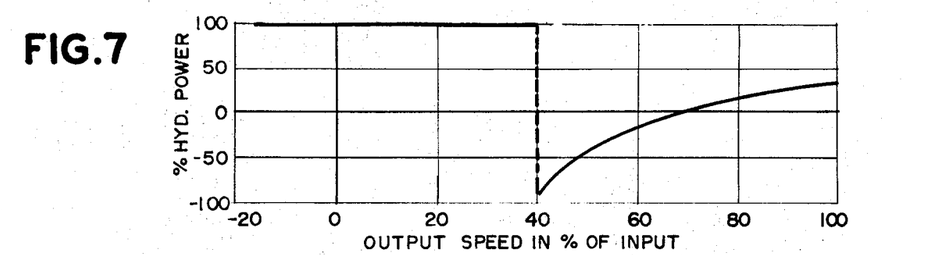

In operation, the embodiment according to FIG. 1 may be described best in conjunction with FIGS. 6–8. Referring to FIG. 8, it will be seen that the displacement of the unit 30, the driven member of the hydrostatic drive device, remains fixed throughout the operation of the transmission because of the fixed angle of the reaction surface 34. It will be understood, however, that an angularly displaceable swash plate could be substituted for the fixed reaction surface 34 as will hereinafter be described in conjunction with the modification of FIG. 11. The driving unit 24, on the other hand, has its swash plate 28 disposed in the zero displacement or center position to produce zero output speed as indicated by the point $a$ in FIG. 8 whereas it is displaced from this center position towards the dashed-line position of FIG. 1 to impart reverse drive to the output as indicated by the line segment $b$ when the brake B is locked and the clutch C is disengaged. Thus, the arrangement of the transmission is such that when the driving and driven members 24 and 30 are rotated in the same direction in the low speed operation the output shaft 14 rotates in the opposite direction as will be evident from FIG. 2 since the double set of planet gears 56 and 58 react with the ring gear 60 to drive the carrier in opposite direction of rotation with respect to the sun gear. For forward speed drive in low range mode, the swash plate 28 is displaced toward the full-line position in FIG. 1 as indicated by the line segment $c$ until it reaches a maximum angularity position as indicated at the point $d$ whereafter the swash plate 28 is retroacted back to the neutral or center position as indicated by the line segment e and thereafter towards the dashed-line position of FIG. 1 as indicated by the line segment f, passing through the zero displacement position as indicated at the point g.

Referring to FIG. 6, and considering a constant speed input at the shaft 12 so that the element 40 of the planetary gear means 22 is rotating at the same speed as is the driving member 24, the sun gears 46 and 48 may be driven in the same rotational direction as is the driving member 24 to impart reverse speed drive indicated by the line segment i or, if the swash plate 28 is so positioned as to drive the sun gears 46 and 48 in the opposite sense of rotation with respect to the input unit 24 the sun gears 48 and 46 and the driven element 30 will increase in negative input speed until the maximum displacement of the swash plate 28 is reached the drive to this point is 100% hydraulic as indicated in FIG. 7 and the hydrostatic drive system drives the output shaft 14 in the positive direction through the torque multiplication of the planetary gear means 20 which, for the illustrative embodiment shown is at a torque multiplication of 2.5. This operation in the low speed mode, utilizing the torque multiplication of the planetary gear means 20 substantially reduces the torque and size of hydraulic drive and also minimizes the bulk, associated noise and inefficiencies common to large hydraulic drive systems.

When the output speed reaches 40% of the input speed in FIG. 6, the gear ratios of the two planetary gear sets 20 and 22 is such that the ring gear 44 on the high speed planetary gear means 22 rotates at the same speed as does the driving element 40 of the clutch C so that the clutch C may then be synchronously engaged while, simultaneously, the brake B is disengaged, thus effectively shifting from the low speed to the high speed planetary gear set. The speed range in the high speed mode is extended by retroacting the swash plate 28 to decrease the speed of the driven element 30 back to zero and then to impart positive rotational motion thereto, during the former part of which the hydraulic system subtracts or reduces the speed of the high speed planetary gear means as is indicated in FIG. 7. It will be noted that at the moment of change from low speed to high speed mode, that a portion of mechanical power through planetary gear set 22 is subtracted or regenerated back through the sun gear 48 and through hydrostatic units 30 and 24 to the forward end of input shaft 12 and output torque of planetary gear set 22.

The amount of regeneration gradually reduces as the output speed is increased as indicated in FIG. 7 until the sun gear 48 is stationary whereafter the drive through the hydrostatic units 24 and 30 to the sun gear 48 is additive to the input shaft 12. A feature of the embodiment of FIG. 1 which lends it particularly well suited for automotive uses will be evident from FIG. 6. This has to do with the fact that the carrier 50 which is the common element of the two gear sets 20 and 22, planet gears 56 and 58 and 64 supported thereon, ring gears 60 and 44, and sun gears 46 and 48 connected to the hydrostatic unit 30 are all rotating in the same direction and approach the same speed at a one-to-one output ratio as indicated by the point J in FIG. 6. This maintains practical speed levels and minimizes relative speeds between components which reduces wear, noise level and frictional and windage losses. When operating in lower speed ranges since the carrier 50 drives the output the speed of the carrier and planetary elements are maintained within practicable limits thereby to assure that the transmission is long-lasting and otherwise to make use of the inherent advantages of planetary gear sets.

By the construction herein, utilizing in general the principles described above in connection with FIGS. 1 and 2, the present invention incorporates a substantially improved construction wherein the planetary input connections are concentric which allows direct connection to the hydrostatic drive and transmission input means. With improved construction it eliminates countershafts, auxiliary gears, associated bearings and housings and thereby reduces the complexity and cost of the transmission and also allows arrangement of the hydrostatic drive, planetary assembly and transmission input on a single axis which would reduce the overall size and weight of making the present transmission more adaptable to motor vehicles.

The present invention further provides that the hydraulic drive operating speeds and loads are kept within practical design limits, that the output planetary construction is reasonably simple and producible and that the operating variables such as input speed, output speed and range of operation are within practical limits.

Figure 3:
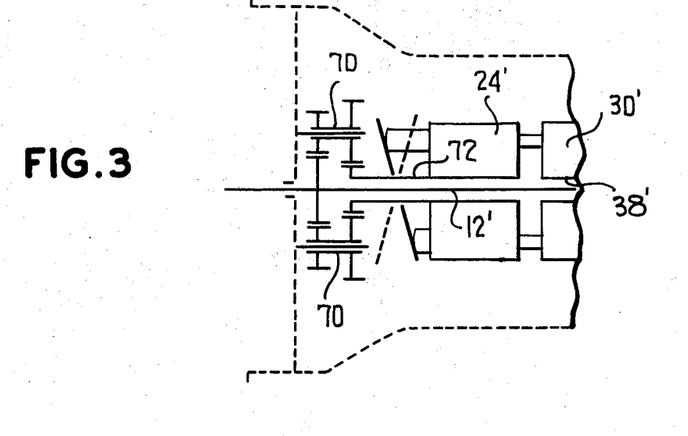
FIG. 3 is a longitudinal section showing diagrammatically a modification of the input drive to the transmission.

With reference to FIG. 3, it will be appreciated that the principles described above in conjunction with FIGS. 1 and 2 also lend themselves readily to a concentric or coaxial arrangement wherein the driving member 24 of the hydrostatic unit is rotated at a speed different than the mechanical input shaft. Thus, as shown, the mechanical input shaft 12' is not directly connected to the driving member 24' of the hydrostatic drive unit but is instead coupled thereto through one or more gear clusters 70 which rotate a quill shaft 72 at a higher rotational speed than the mechanical input shaft 12' it being understood by interchanging the corresponding gears the quill shaft 72 is rotated at a lower rotational speed than the mechanical input shaft 12'. Thus, the maximum speed of the input quill shaft 38' is higher (or lower) in the case of FIG. 3 than is the situation with respect to FIG. 1.

This has the effect with reference to FIGS. 6, 7 and 8 of modifying the detail operating characteristics, however, the general operation is otherwise the same.

Figure 4:
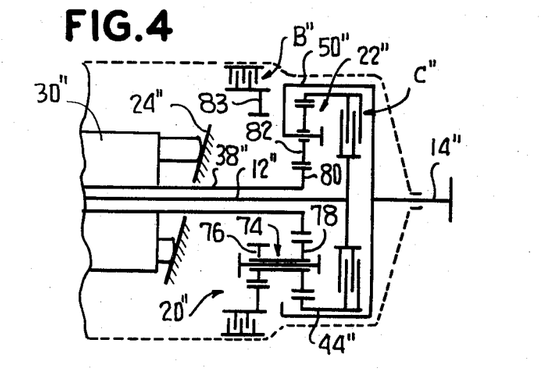
FIG. 4 is a longitudinal section diagrammatically illustrating a modified output drive of the transmission.
Figure 5:
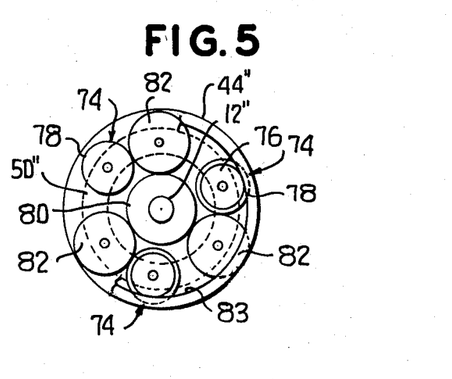
FIG. 5 is a transverse section partly broken away illustrating the arrangements of the planetary gear sets of FIG. 4.

In FIG. 4, the modification shown therein differs essentially from the construction described in conjunction with FIG. 1 only in relatively minor respects. Again, as is the case with FIG. 1, the construction according to FIG. 4 utilizes a common carrier member 50'' which establishes the drive coupling between the two planetary gear means 20'' and 22'' but in FIG. 4, this carrier supports cluster gear sets 74 each of which includes a planet gear 76 and a planet gear 78, as shown. Further, there is but a single sun gear input 80 to both of the planetary units in FIG. 4. This sun gear 80 is in mesh with the planet gears 82 which react with it and the ring gear component or element 44'' of the high speed planetary set 22'' which carries the driven elements of the clutch C''. As will be evident in FIG. 5, the planet gears 82 are also in mesh with the planet gears 78 of the planet gear clusters 74 and planet gears 76 of the several clusters are in mesh with the ring gear 83 of the low speed planetary gear means which is selectively braked by the brake means B''.

In FIG. 4, double prime numbers have been used to indicate general corresponding parts with respect to the embodiment described above in conjunction with FIG. 1.

Figure 9:
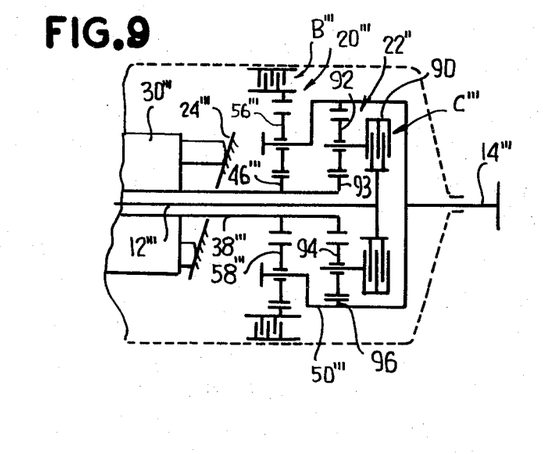
FIG. 9 is a view similar to FIG. 4 but illustrating diagrammatically a further modification of the invention.
Figure 10:
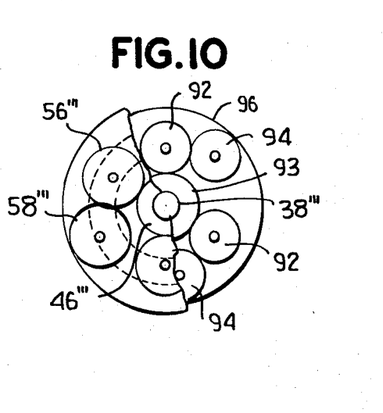
FIG. 10 is a transverse section, partly broken away, illustrating the arrangements of the planetary gear sets of the embodiment of FIG. 9.

In FIG. 9, wherein triple prime numbers are utilized to designate parts corresponding with those of FIG. 1, and also with respect to FIG. 4, the essential difference over the embodiments previously described is that whereas in FIGS. 1 and 4 the dual-inputs to the high speed planetary are to the sun gear and the ring gear, in FIG. 9 the inputs to the high speed planetary are through the sun gear 93 and the planet gear carrier 90 which is the driven element of the clutch C'''. The planet gear carrier 90 rotatably mounts planet gear sets 92 and 94 respectively in mesh with the sun gear 93 and the ring gear 96 of the high speed planetary gear means. As will be evident from FIG. 10, the planet gear sets 92, 94 are in mesh with each other as shown.

Figure 11:
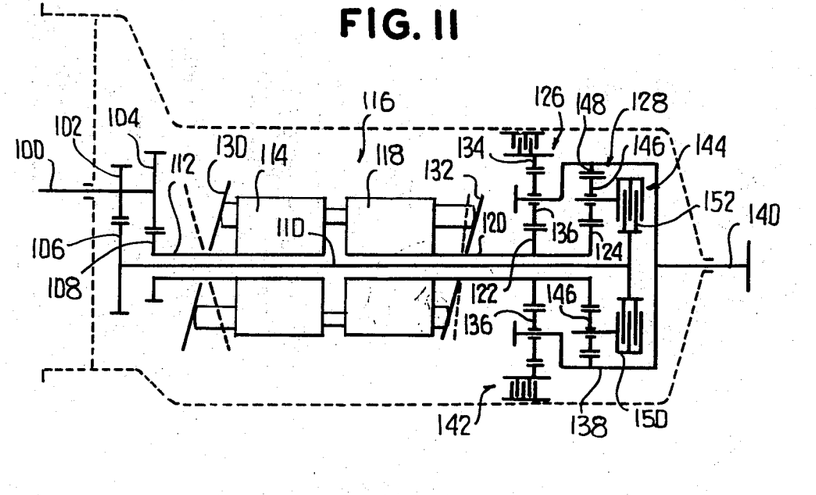
FIG. 11 is a longitudinal section similar to FIG. 1 but illustrating diagrammatically a further modification of the invention.

Referring to FIG. 11, the modification shown therein is particularly adaptable to tractors and related construction equipment. The input arrangement allows the transmission to be located low with respect to the engine and the gear drive ratios can be readily modified to match different engine speeds without any major changes to the overall transmission assembly. Furthermore, in this type of equipment the transmission must normally operate at continuously high power at low speeds and therefore it is preferred that the output planetary contain simple gear sets to assure distribution of the high loads and maximum reliability and life.

In this arrangement, the power input means is in the form of a shaft 100 driven from the associated engine and having a pair of gears 102 and 104 thereon which are in mesh respectively with the gears 106 and 108. As shown, the gear 106 is fixed to the mechanical input shaft 110 whereas the gear 108 is fixed to the quill shaft 112 which is connected to the driving member 114 of the hydrostatic drive unit 116. The driven member 118 of the hydrostatic drive unit is fixed to the input quill shaft 120, which shaft is provided with two sun gears 122 and 124 providing respectively an input path to the low speed planetary gear means 126 and to the high speed planetary gear means 128.

The hydrostatic drive unit 116 is provided with an angularly displaceable swash plate 130 associated with the driving unit 114 and the driven unit 118 likewise is provided with an angularly adjustable swash plate 132, as shown. At this point, it may be mentioned that an angularly adjustable swash plate such as is shown in FIG. 11 for the driven unit 118 may as well be employed in the constructions of modifications hereinabove described.

The sun gear 122 is reacted with the ring gear 134 through the intermediary of the planet gears 136 mounted on a carrier 138 which as in the previous embodiments extends around the high speed planetary gear means 128 therewithin and is connected to the output shaft 140. The ring gear 134 is selectively braked by the brake mechanism 142 and the clutch arrangement of this embodiment is indicated by the reference character 144.

The sun gear 124 is in mesh with the planet gears 146 which react between it and the ring gear 148 of the high speed planetary gear means, the planet gears 146 being mounted on a carrier 150 which forms the driven element of the clutch 144, the driving element or elements 152 being connected to the input shaft 110 as shown.

Figure 12:
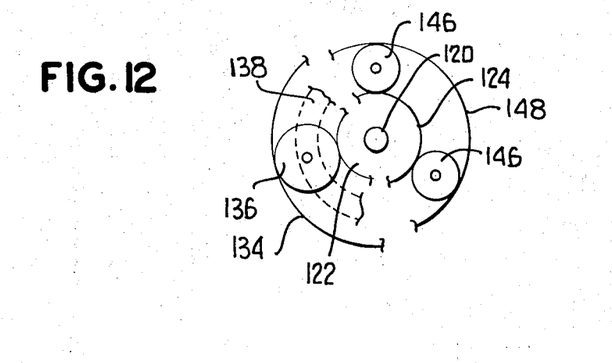
FIG. 12 is a transverse section, partly broken away, illustrating the arrangement of the planetary gear sets of the embodiment of FIG. 11.
Figure 13:
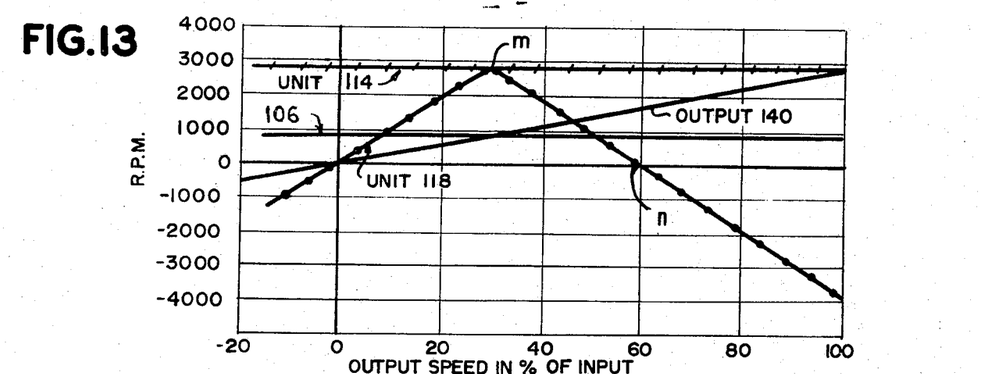
FIGS. 13, 14 and 15 are graphs illustrating certain characteristics of the modified transmission of FIG. 1.
Figure 14:
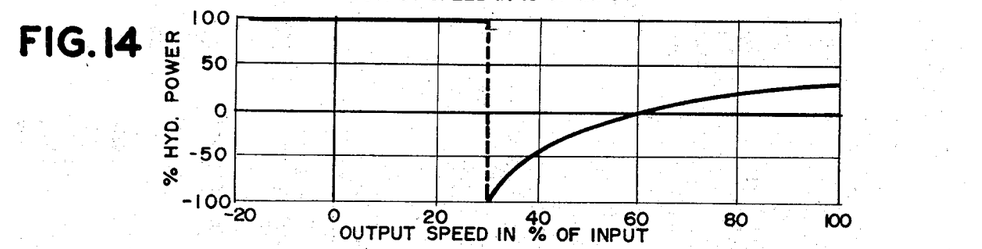

In the embodiment of FIG. 11 and as will be evident from FIG. 12, for low speed mode operation and forward speed of the vehicle, the driving and driven elements 114 and 118 of the hydrostatic unit 116 rotate in the same direction. At this time, the brake 142 is of course engaged whereas the clutch 144 is disengaged. As the swash plate 130 is moved to effect maximum displacement thereof in the direction causing the two units 114 and 118 to rotate together in unison, increasing low range speed at the output shaft 140 is obtained which is evident from the graph of FIG. 13. When the maximum rotational speed of the member 118 is obtained at the point m in FIG. 13 brake 142 is disengaged and at the same instant clutch 144 is engaged to effect high speed mode operation. As the swash plate 130 is retroacted toward the dashed-line position in FIG. 11 ultimately it reaches the zero displacement position at point n of the graph in FIG. 13 and is thereafter retroacted further to cause now the driven member 118 to rotate in the direction opposite to the direction of rotation of the driving member 114. At this point, the output shaft 140 is rotating in the same direction as the input to the driving member 114 and approaches the same rotational speed, as indicated.

Figure 15:
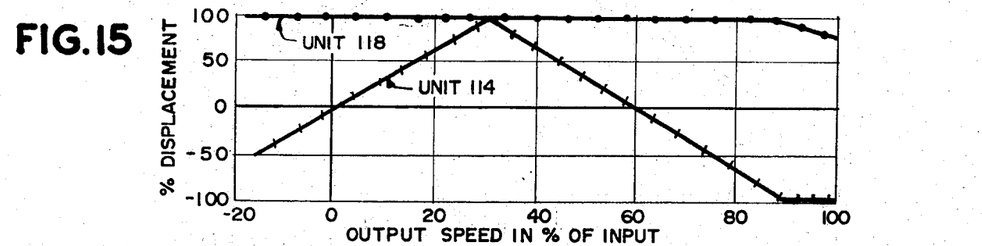

From FIG. 15, it will be appreciated that the angular displacement of the swash plate 130 is at its maximum at about 85% of the output speed and, at this point, the swash plate 132 is moved in the direction towards the dashed-line position of FIG. 11 to decrease the displacement of the driven member 118 as indicated thereby to continue increase of the output speed of the member 118 as will be evident.

The advantages of the embodiment of FIG. 11 are that for continuous operation at high powers and low speeds at the output, the driving and driven elements 114 and 118 and all of the output planetary components of the planetary gear means are turning in the same direction at low or moderate speeds which reduce the bearing loads, speeds and power losses and increases overall efficiency.

Figure 16:
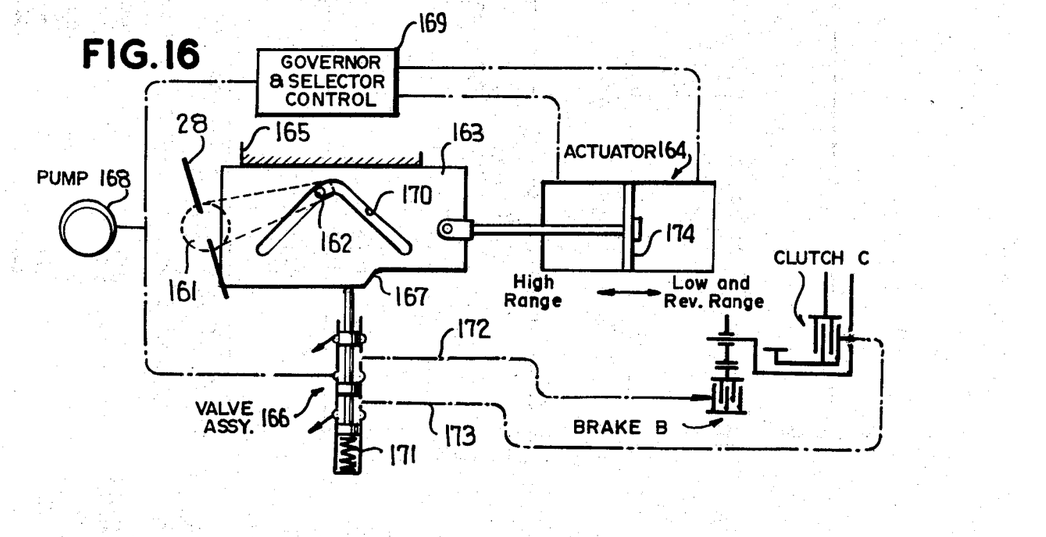
FIG. 16 is a schematic view illustrating a typical control system.

FIG. 16 is a schematic of a control system for the modification shown in FIG. 1 though it is adaptable to the other modifications.

As shown, the swash plate 28 is provided with a pivot 161 and a radial arm extending from this pivot carries a pin 162 which fits into the inverted V-shaped slot 170 in the cam plate 163. A piston type actuator 164 is pinned to the cam plate which slides on and is guided by the support member 165. Immediately below the cam is a valve assembly 166 which rides on the cam plate by action of the spring 171 and has lines 172 and 173 extending therefrom which connect respectively to the low range brake B and the high range clutch C. A conventional pump 168 provides fluid pressure to valve assembly 166 and the governor selector control assembly 169. This control assembly has lines extending therefrom which connect to the actuator 164 selectively to pressurize one side or the other of the piston 174 correspondingly to move and to position it and the cam plate 163.

The governor and selector control assembly functions to provide fluid pressure to the actuator to effect the desired drive ratio. A more detailed operation of this function may be understood by reference to my earlier Pat. No. 3,212,358, Oct. 19, 1965.

When the actuator is in the position shown, it is noted that fluid pressure flows through the valve assembly 166 to actuate the low range brake B and at the same time the pressure in the high range clutch is vented. As the actuator is moved toward the high range position the cam slot 170 positions the swash plate 28 as indicated in FIG. 8 to the full negative displacement. At this point the valve assembly spool moves up the incline 167 of the cam plate and allows fluid pressure to engage the high range clutch C while simultaneously venting and disengaging the low range brake C to effect the change from low range mode to high range mode. As the actuator moves further toward high range the swash plate is retroacted as previously described. When the actuator moves back toward low range the same functioning is accomplished in reverse order.

What is claimed is:

1. A power transmission for use with power input means for imparting rotary drive to the transmission, comprising in combination:

an input quill shaft and an inner shaft coaxial therewithin in which said inner shaft projects beyond said quill shaft at either end thereof;

low speed planetary gear means and high speed planetary gear means each centered about said input shafts and including sun gear input means connected to said quill shaft for continuously imparting one input path to both of said planetary gear means; said low speed planetary gear means also including third-element gear means and planet gear means for reacting between said sun gear input means and the said third-element gear means and said high speed planetary gear means also including third-element gear means and planet gear means for reacting between said sun gear input means and the third-element gear means of said high speed planetary gear means;

an output shaft aligned with but disposed beyond said input shafts;

one of the two gear means constituted by said third-element gear means of said high speed planetary gear means and said planet gear means of said high speed planetary gear means being connected to said output shaft and to said planet gear means of said low speed planetary gear means whereby said output shaft is capable of connection to said sun gear input means through either of said low speed and said high speed planetary gear means and a continuous drive coupling is effected between said low speed and said high speed planetary gear means;

a hydrostatic drive unit comprising a driving member mechanically connected to said power input means and a rotatable driven member connected to said input quill shaft and including means for infinitely varying the rotational speed of said driven member between first and second maximum speeds which are of opposite rotational sense with respect to each other and of maximum sense with respect to the rotational speed of said driving member;

brake means for selectively braking said third-element gear means of said low speed planetary gear means to prevent rotation thereof and establish low speed drive; and clutch means for selectively coupling said power input means to the other of said two gear means of the high speed planetary gear means through said inner input shaft to establish high speed drive;

and the gear ratios of said low speed and said high speed planetary gear means being such that as the speed of said output shaft is increasing in low speed range and said driven member of the hydrostatic unit attains said first maximum speed, said clutch means may be synchronously engaged while said brake means is disengaged under substantially no load, and as the speed of said output shaft is decreasing in high speed range and said driven member attains said first maximum speed, said clutch means may be synchronously disengaged while said brake means is engaged under substantially no load.

2. A power transmission as defined in claim 1 wherein said planet gear means of the high speed planetary gear means is connected to said output shaft and to the planet gear means of said low speed planetary gear means and said third-element gear means of said high speed planetary is selectively coupled to said inner shaft by said clutch means.

3. A power transmission as defined in claim 1 wherein said third-element gear means of said high speed planetary gear means is connected to said output shaft and to the planet gear means of said low speed planetary gear means and said planet gear means of said high speed planetary gear means is selectively coupled to said inner shaft by said clutch means.

4. In a drive train of the type including power input means; an output shaft; a pair of input shafts one of which is connected directly to the power input means; hydrostatic drive means connecting the power input means to the other of said input shafts; a pair of in-line planetary gear means having a drive interconnection therebetween, one of said planetary gear means having a single input from said one input shaft to drive the output shaft in low speed mode while effecting torque multiplication through such low speed planetary gear means, and the other planetary gear means having inputs from both input shafts to drive said output shaft in high speed mode by differential dual-input power to such high speed planetary gear means; said hydrostatic drive means including means for effecting relatively reverse directions of rotation of said one input shaft whereby in low speed mode both forward and reverse direction drive is possible at the output shaft and whereby in high speed mode the range thereof is extended by coupling said one input shaft through a progressively changing rotational speed program from a first maximum rotational speed in one direction of rotation to a second maximum rotational speed in the opposite direction of rotation; the ratios of said planetary gears means being such that synchronous shifting between said low and high speed modes is effected at said first maximum speed of rotation of one input shaft, the improvement wherein:

said one input shaft is a quill shaft and said other input shaft is coaxial with said quill shaft and projects completely through said quill shaft for connection at its opposite ends respectively with said power input means and with said high speed planetary gear means;

said low speed planetary gear means and said high speed planetary gear means each being centered about said input shafts and including sun gear input means connected to said quill shaft for continuously imparting one input path to both of said planetary gear means; said low speed planetary gear means also including third-element gear means and planet gear means for reacting between said sun gear input means and said third-element gear means and said high speed planetary gear means also including third-element gear means and planet gear means for reacting between said sun gear input means and the third-element gear means of said high speed planetary gear means; said output shaft being aligned with but disposed beyond said input shafts and said high speed planetary gear means being disposed closest to said output shaft;

one of the two gear means constituted by said third-element gear means of said high speed planetary gear means and said second planet gear means of said high speed planetary gear means being connected to said output shaft and to said planet gear means of said low speed planetary gear means whereby said output shaft is capable of connection to said sun gear input means through either of said low and high speed planetary gear means and a continuous drive coupling is effected between said low speed and said high speed planetary gear means;

said hydrostatic drive unit comprising a driving member mechanically connected to said power input means and a rotatable driven member connected to said quill shaft and including means for infinitely varying the rotational speed of said driven member between said first and said second maximum speeds;

brake means for selectively braking said third-element gear means of said low speed planetary gear means to prevent rotation thereof and establish low speed drive; and clutch means for selectively coupling said power input means to the other of said two gear means of the high speed planetary gear means through said other input shaft to establish high speed drive.

5. A synchronously shiftable, extended range transmission comprising, in combination:

an input shaft adapted to be driven in fixed speed ratio with respect to an associated prime mover;

a hydrostatic pump fixed to said input shaft and including movable swash plate means for selectively varying the displacement of said pump, said input shaft having an input section leading to said pump and a further section leading from said pump;

a quill shaft surrounding said further section of the input shaft and exposing an end portion thereof beyond said quill shaft;

a hydrostatic motor fixed to said quill shaft receiving fluid displaced by said pump for rotating said quill shaft to a first maximum rotational speed in a direction opposite to the direction of rotation of said input shaft and then to a second maximum rotational speed in a direction the same as the rotation of said input shaft;

a pair of sun gears fixed to said quill shaft in axially spaced relation thereon so that one sun gear is closest to said motor and the other is more remote from said motor;

a low speed planetary ring gear concentric with said one sun gear and a high speed planetary ring gear concentric with said other sun gear;

low speed planet gear means reacting between said one sun gear and said low speed planetary ring gear, said low speed planetary gear means comprising an inner planet gear in mesh with said one sun gear and an outer planet gear in mesh both with said inner planet gear and said low speed planetary ring gear, and a planet gear carrier rotatably supporting said inner and outer planet gears;

high speed planet gear means reacting between said other sun gear and said high speed planetary ring gear, said high speed planet gear means comprising a planet gear meshing with both said other sun gear and said high speed planetary ring gear, and said planet gear of the high speed planet gear means being rotatably carried by said planet gear carrier of the low speed planet gear means whereby the low speed and high speed planet gear means are directly connected through such planet gear carrier;

clutch means selectively coupling said high speed planetary ring gear to said end portion of the input shaft exposed beyond said quill shaft;

brake means selectively braking said low speed planetary ring gear; and an output shaft coaxial with said input and quill shafts but disposed in spaced relation to said end portion of the input shaft;

said planet gear carrier enclosing the high speed planetary gear set formed by said other sun gear, said high speed planetary ring gear and said high speed planet gear means and being directly connected to said output shaft.

6. A synchronously shiftable, extended range transmission comprising in combination:

an input shaft adapted to be driven in fixed speed ratio with respect to an associated prime mover;

a hydrostatic pump fixed to said input shaft and including movable swash plate means for selectively varying the displacement of said pump, said input shaft having an input section leading to said pump and a further section leading from said pump;

a quill shaft surrounding said further section of the input shaft and exposing an end portion thereof beyond said quill shaft;

a hydrostatic motor fixed to said quill shaft receiving fluid displaced by said pump for rotating said quill shaft to a first maximum rotational speed in a direction opposite to the direction of rotation of said input shaft and then to a second maximum rotational speed in a direction the same as the rotation of said input shaft;

a low speed planetary gear set surrounding said quill shaft and including a low speed planetary ring gear and low speed planet gear means in mesh with said low speed planetary ring gear;

a high speed planetary gear set surrounding said quill shaft to that side of said low speed planetary gear set opposite said pump and including a high speed planetary ring gear and high speed planet gear means in mesh with said high speed planetary ring gear;

an output shaft coaxial with said input and quill shafts but disposed in spaced relation to said end portion of the input shaft which is exposed beyond said quill shaft;

a low speed planet gear carrier enclosing said high speed planetary gear set and connected directly to said output shaft, said low speed planet gear means being rotatably carried by said low speed planet gear carrier and one of said high speed planet gear means and said high speed planetary ring gear being carried by said low speed planet gear carrier;

clutch means selectively coupling said end portion of the input shaft to that one of said high speed planet gear means and said high speed planetary ring gear which is not carried by said low speed planet gear carrier;

brake means selectively braking said low speed planetary ring gear; and sun gear means connected to said quill shaft for rotating said planet gear carrier through at least one of said low speed and high speed planet gear means.

7. A synchronously shiftable, extended range transmission as defined in claim 6 wherein said sun gear input means comprises a pair of sun gears fixed to said quill shaft, said low speed planet gear means comprising an inner planet gear meshing with one of said pair of sun gears and an outer planet gear meshing both with said inner planet gear and said low speed planetary ring gear, and said high speed planet gear means comprising a planet gear meshing both with the other of said pair of sun gears and said high speed planetary ring gear, said high speed planet gear means being carried by said planet gear carrier.

8. A synchronously shiftable, extended range transmission as defined in claim 6 wherein said high speed planet gear means comprises an inner planet gear and an outer planet gear meshing with both said inner planet gear and said high speed planetary ring gear, said sun gear means comprising a single sun gear meshing with said inner planet gear and said low speed planet gear means comprising a planet gear meshing with said low speed planetary ring gear and rotating in unison with said outer planet gear of the high speed planet gear means.

9. A synchronously shiftable, extended range transmission as defined in claim 6 wherein each of said low speed and said high speed planet gear means comprises an inner planet gear and an outer planet gear in mesh therewith, said sun gear means comprises a pair of sun gears meshing with the inner planet gears of said low speed and high speed planet gear means, and said clutch means selectively couples said end portion of the input shaft to the inner planet gear of said high speed planet gear means.

10. A synchronously shiftable, extended range transmission as defined in claim 6 wherein each of said low speed and said high speed planet gear means comprises an inner planet gear and an outer planet gear in mesh therewith, said sun gear means comprises a pair of sun gears meshing with the inner planet gears of said low speed and high speed planet gear means, and said clutch means selectively couples said end portion of the input shaft to the inner planet gear of said high speed planet gear means.

11. A synchronously shiftable, extended range transmission comprising, in combination:
a quill shaft and an input shaft coaxial within said quill shaft with said input shaft having an end portion projecting from said quill shaft;

a high speed planetary gear set surrounding said quill shaft adjacent that end thereof from which said inner shaft projects;

a low speed planetary gear set surrounding said quill shaft to that side of said high speed planetary gear set away from said end portion of the input shaft;

said low speed planetary gear set including a low speed planetary ring gear and low speed planet gear means meshing therewith and including a planet gear carrier, and sun gear means for rotatably driving said planet gear carrier;

said high speed planetary gear set comprising a high speed planetary ring gear and high speed planet gear means meshing therewith, and said sun gear means meshing with said high speed planet gear means;

an output shaft coaxial with said input and quill shafts but disposed in spaced relation to said end portion of the input shaft;

said planet gear carrier enclosing said high speed planetary gear set and being connected directly to said output shaft, one of said high speed planetary ring gear and said high speed planet gear means being carried by said planet gear carrier;

clutch means for selectively coupling said end portion of the input shaft to that one of said high speed planetary ring gear and said high speed planet gear means which is not carried by said planet gear carrier;

brake means for selectively braking said low speed planetary ring gear;

a hydrostatic pump connected to said input shaft remote from said end portion thereof and adapted to be driven in fixed ratio from a prime mover and including swash plate means for selectively varying the quantity of fluid displaced by said pump; and a hydrostatic motor fixed to said quill shaft remote from said end portion of the input shaft and connected to said pump for infinitely variable driven ratio with respect thereto.

12. A synchronously shiftable, extended range transmission as defined in claim 11 wherein said sun gear input means comprises a pair of sun gears fixed to said quill shaft, said low speed planet gear means comprising an inner planet gear meshing with one of said pair of sun gears and an outer planet gear meshing both with said inner planet gear and said low speed planetary ring gear, and said high speed planet gear means comprising a planet gear meshing both with the other of said pair of sun gears and said high speed planetary ring gear, said high speed planet gear means being carried by said planet gear carrier.

13. A synchronously shiftable, extended range transmission as defined in claim 11 wherein said high speed planet gear means comprises an inner planet gear and an outer planet gear meshing with both said inner planet gear and said high speed planetary ring gear, said sun gear means comprising a single sun gear meshing with said inner planet gear and said low speed planet gear means comprising a planet gear meshing with said low speed planetary ring gear and rotating in unison with said outer planet gear of the high speed planet gear means.

14. A synchronously shiftable, extended range transmission as defined in claim 11 wherein said sun gear means comprises a first sun gear meshing with said low speed planet gear means and a second sun gear meshing with said high speed planet gear means, said low speed planet gear means comprising a planet gear meshing both with said first sun gear and said low speed planetary ring gear, said high speed planet gear means comprising a planet gear meshing both with said second sun gear and said high speed planetary ring gear, and said planet gear carrier carrying said high speed planetary ring gear.

* * * * *

UNITED STATES PATENT AND TRADEMARK OFFICE
CERTIFICATE OF CORRECTION

PATENT NO. : 3,855,879
DATED : Dec. 24, 1974
INVENTOR(S) : George M. DeLalio

It is certified that error appears in the above-identified patent and that said Letters Patent are hereby corrected as shown below:

Column 2, line 3 after "planetary" insert ---system whereby the inherent torque multiplication of the planetary--- .

Signed and Sealed this

Nineteenth Day of October 1976

[SEAL]

Attest:

RUTH C. MASON
*Attesting Officer*

C. MARSHALL DANN
*Commissioner of Patents and Trademarks*